(12) United States Patent
Liu

(10) Patent No.: US 11,207,162 B1
(45) Date of Patent: Dec. 28, 2021

(54) ELECTRIC TOOTHBRUSH HEAD

(71) Applicant: Guangdong Meihong Industrial Technology Co., Ltd., Shenzhen (CN)

(72) Inventor: Yafei Liu, Gaozhou (CN)

(73) Assignee: GUANGDONG MEIHONG INDUSTRIAL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/377,938

(22) Filed: Jul. 16, 2021

(30) Foreign Application Priority Data

Mar. 11, 2021 (CN) .......................... 202120514888.6

(51) Int. Cl.
*A46B 13/02* (2006.01)
*A61C 17/26* (2006.01)
*A61C 17/34* (2006.01)
*A61C 17/22* (2006.01)

(52) U.S. Cl.
CPC ............ *A61C 17/222* (2013.01); *A46B 13/02* (2013.01); *A61C 17/26* (2013.01); *A61C 17/34* (2013.01); *A61C 17/3481* (2013.01)

(58) Field of Classification Search
CPC ..... A46B 13/02; A46B 13/023; A61C 17/222; A61C 17/26; A61C 17/34; A61C 17/3481
See application file for complete search history.

(56) References Cited

U.S. PATENT DOCUMENTS

| 9,655,480 | B2* | 5/2017 | Fang ...................... A46B 13/02 |
| 2003/0163882 | A1* | 9/2003 | Blaustein ............. A46B 13/008 |
| | | | 15/22.2 |
| 2004/0049868 | A1* | 3/2004 | Ng ........................ A61C 17/34 |
| | | | 15/22.2 |

* cited by examiner

*Primary Examiner* — Randall E Chin
(74) *Attorney, Agent, or Firm* — WPAT, PC

(57) ABSTRACT

An electric toothbrush head includes a brusher, a supporting housing, a transmission shaft, and a tail plug. The brusher is provided with a hairy surface, an inner wall of the brusher away from the hairy surface is provided with an outer ring column, a pothole is provided in a middle of the outer ring column, and two spiral fitting grooves are provided at two symmetrical ends of an outer sidewall of the outer ring column. A connector is provided on a top of the supporting housing and matched with the brusher, a cylinder is provided in a middle of the connector and matched with the outer ring column, two first bayonets are provided at two symmetrical ends of an inner wall of the connector and snapped with the two spiral fitting grooves. The electric toothbrush head can improve the cleanliness, prolong the service life and eliminate the noise.

5 Claims, 4 Drawing Sheets

ELECTRIC TOOTHBRUSH HEAD

TECHNICAL FIELD

The disclosure relates to the technical field of electric toothbrushes, and particularly to an electric toothbrush head.

DESCRIPTION OF RELATED ART

Electric toothbrushes use a high-speed vibrating movement (also referred to as motor) to drive toothbrush heads thereof to rotate or vibrate to achieve the effect of cleaning teeth. Because of a high amplitude of each electric toothbrush, bristles thereof move quickly with the toothbrush, which can effectively shake off dental calculus on a tooth surface and between the teeth. Compared with the traditional manual toothbrush, the electric toothbrush has a better cleaning effect, saves time and labor, and is deeply loved by modern people.

An existing electric toothbrush can be used continuously only by replacing a new toothbrush head after the bristles are worn. However, an existing electric toothbrush head has many components and a relatively complex structure, which not only leads to high manufacturing and assembly costs, but also leads to complex transmission among the components and high damage rate, which brings many inconveniences to people's daily use.

Therefore, an electric toothbrush head is proposed to solve the above problems.

SUMMARY

The disclosure aims to solve the problem that the toothbrush head is difficult to replace in the prior art, and thus provides an electric toothbrush head.

In order to achieve the above purpose, the disclosure adopts the following technical solutions.

An electric toothbrush head includes a brusher, a supporting housing, a transmission shaft, and a tail plug. The brusher is provided with a hairy surface, an inner wall of the brusher facing away from the hairy surface is provided with an outer ring column, a pothole is provided in a middle of the outer ring column, and two spiral fitting grooves are respectively provided at two symmetrical ends of an outer sidewall of the outer ring column. A connector is provided on a top of the supporting housing, the connector is matched with the brusher, a cylinder is provided in a middle of the connector and matched with the outer ring column, two first bayonets are respectively provided at two symmetrical ends of an inner wall of the connector, and the two first bayonets are respectively snapped with the two spiral fitting grooves. A positioning pin is provided at a topmost portion of the transmission shaft and matched with the supporting housing, a second bayonet is provided at a central point of the positioning pin, and the second bayonet is arranged in a middle of the pothole. The tail plug is provided with a third bayonet fitted with the supporting housing.

Preferably, each of the brusher, the supporting housing and the tail plug is an environmentally friendly plastic part, and the supporting housing wraps the transmission shaft and the tail plug.

Preferably, the supporting housing is provided with an opening, and a part of the transmission shaft close to the opening is provided with a starting button.

Preferably, the tail plug is snap-fitted with the transmission shaft, and the connector is rotatably connected to the supporting housing.

Preferably, an outer sidewall of the supporting housing is provided with anti-skid prisms, an end of the tail plug facing away from the third bayonet is provided with an annular gasket, and the annular gasket is matched with a bottom end of the supporting housing.

Compared with the prior art, the electric toothbrush of the disclosure has the following beneficial effects.

Firstly, this design can improve the cleanliness of the electric toothbrush to a greatest extent, prolong the service life of the electric toothbrush, eliminate noise thereof, and solve problems of too much noise caused by leftward and rightward swings of the cylinder, too much noise caused by leftward and rightward swings of the transmission shaft, and insufficient service life and strength, and thus the electric toothbrush head of the disclosure is convenient to use.

Secondly, the whole electric toothbrush head has fewer components, and each of the components is made of environmentally friendly plastic part, and is safe and environmentally friendly. The components are snap-fitted with each other and thus are easy to assemble. Moreover, it is convenient to replace the electric toothbrush head, easy to use, simple in structure and saving resources. Also, because each of the components use the environmentally friendly plastic part, the noise is small during use and noise pollution is avoided.

Thirdly, a friction between the supporting housing and a hand of a user can be increased through the anti-skid prisms to avoid the electric toothbrush head from falling off. The annular gasket can make the supporting housing and the tail plug match tighter, which makes the electric toothbrush more beautiful in appearance.

Figure 1:
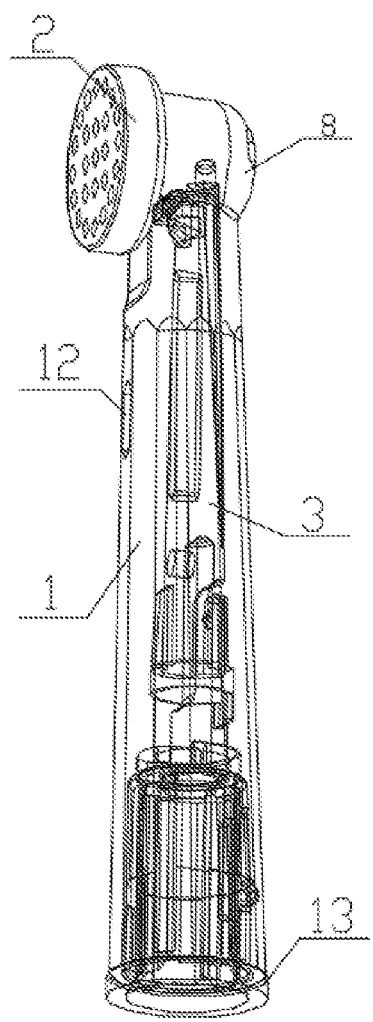
FIG. 1 is a schematic structural view of an electric toothbrush head according to an embodiment of the disclosure.

Reference numerals: 1: Supporting housing; 2: Brusher; 3: Transmission shaft; 4: Tail plug; 5: Outer ring column; 6: Pothole; 7: Spiral fitting groove; 8: Connector; 9: Cylinder; 10: Third bayonet; 11: Anti-skid prism; 12: Starting button; 13: Annular gasket; 14: Positioning pin; 15: First bayonet; 16: Second bayonet.

DETAILED DESCRIPTION OF EMBODIMENTS

Technical solutions of embodiments of the disclosure will be described clearly and completely with reference to drawings of the embodiments of the disclosure. It is apparent that the described embodiments are only part of the embodiments of the disclosure, but not all embodiments.

Figure 2:
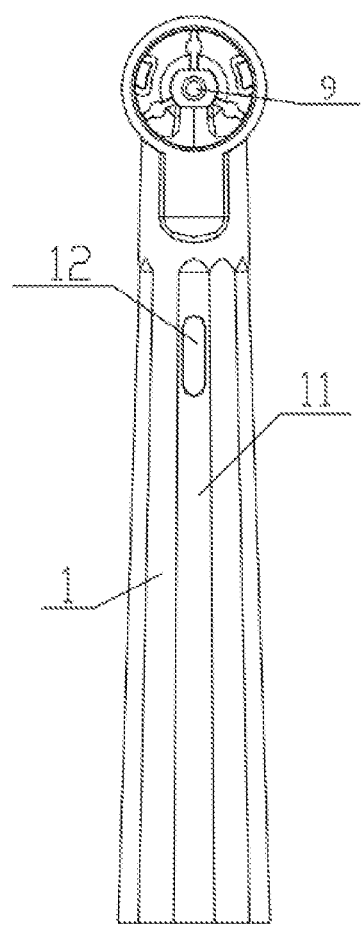
FIG. 2 is a schematic structural view showing a supporting housing and a cylinder of the electric toothbrush head according to the embodiment of the disclosure.
Figure 3:
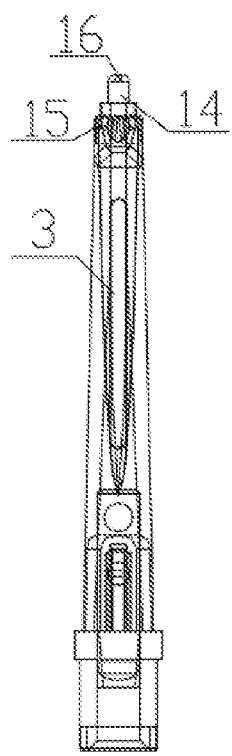
FIG. 3 is a schematic structural view showing a transmission shaft and a positioning pin of the electric toothbrush head according to the embodiment of the disclosure.
Figure 4:
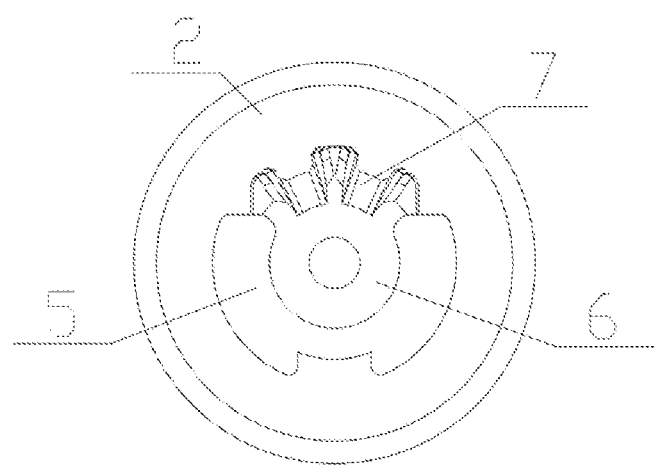
FIG. 4 is a schematic structural view showing a brusher and an outer ring column of the electric toothbrush head according to the embodiment of the disclosure.
Figure 5:
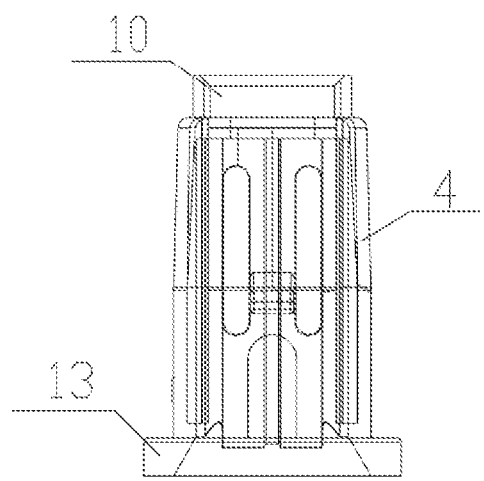
FIG. 5 is a schematic structural view showing a tail plug and an annular gasket of the electric toothbrush head according to the embodiment of the disclosure.

Referring to FIGS. 1-5, an electric toothbrush head includes a brusher 2, a supporting housing 1, a transmission shaft 3, and a tail plug 4. Specifically, the brusher 2 is provided with a hairy surface. An inner wall of the brusher 2 facing away from the hairy surface is provided with an outer ring column (also referred to as outer ring-shaped pillar) 5. A pothole 6 is provided in a middle of the outer ring column 5. Two spiral fitting grooves 7 are respectively provided at two symmetrical ends of an outer sidewall of the outer ring column 5. A connector 8 is provided on a top of the supporting housing 1, and the connector 8 is matched with the brusher 2. A cylinder 9 is provided in a middle of the connector 8 and matched with the outer ring column 5. Two first bayonets (also referred to as two first snap-in members) 15 are respectively provided at two symmetrical ends of an inner wall of the connector 8, and the two first bayonets 15 are respectively snapped with the two spiral fitting grooves 7. A positioning pin 14 is provided at a topmost portion of the transmission shaft 3 and matched with the supporting housing 1. A second bayonet 16 is provided at a central/symmetrical point of the positioning pin 14 and arranged in a middle of the pothole 6. The tail plug 4 is provided with a third bayonet 10 fitted with the supporting housing 1. This design can improve the cleanliness of the electric toothbrush to a greatest extent/degree, prolong the service life of the electric toothbrush, eliminate noise thereof, and solve problems of too much noise caused by leftward and rightward swings of the cylinder 9, too much noise caused by leftward and rightward swings of the transmission shaft 3, and insufficient service life and strength, and thus the electric toothbrush head of the disclosure is convenient to use.

In preferred embodiments, each of the brusher 2, the support housing 1 and the tail plug 4 is an environmentally friendly plastic part. The supporting housing 1 wraps the transmission shaft 3 and the tail plug 4. The supporting housing 1 is provided with an opening and a part of transmission shaft 3 close to the opening is provided with a starting button 12. The tail plug 4 is snap-fitted with the transmission shaft 3. The connector 8 is rotatably connected to the supporting housing 1. An outer sidewall of the supporting housing 1 is provided with anti-skid prisms 11. An end of the tail plug 4 facing away from the third bayonet 10 is provided with an annular gasket 13. The annular gasket 13 is matched with a bottom end of the supporting housing 1. A friction between the supporting housing 1 and a hand of a user is increased through the anti-skid prisms 11 to prevent the electric toothbrush head from falling off. The annular gasket 13 can make the supporting housing 1 and the tail plug 4 match tighter, which makes the electric toothbrush more beautiful in appearance. Further, the whole electric toothbrush head has fewer components, and each of the components is made of environmentally friendly plastic part, and is safe and environmentally friendly. The components are snap-fitted each other and thus are easy to assemble together. Moreover, it is convenient to replace the electric toothbrush head, easy to use, simple in structure and saving resources. Also, because each of the components use the environmentally friendly plastic part, the noise is small during use and noise pollution is avoided.

When the electric toothbrush head of the disclosure is in use, firstly, the brusher 2 is snap-fitted with the connector 8 on the supporting housing 1 through the outer ring column 5 and the cylinder 9, so as to facilitate the brusher 2 to rotate. The transmission shaft 3 then is snap-fitted with the supporting housing 1 and the positioning pin 14 on the transmission shaft 3 extends into the connector 8 to facilitate the positioning pin 14 to be snap-fitted with the pothole 6, and at this situation the two spiral fitting grooves 7 are respectively snap-fitted with the two first bayonets 15, and the second bayonet 16 abuts against a middle portion of the pothole 6, so that the transmission shaft 3 is snap-fitted with the brusher 2. Finally, the tail plug 4 is snap-fitted with the supporting housing 1 through the third bayonet 10, the annular gasket 13 abuts against a bottom portion of the supporting housing 1, and the assembly of the electric toothbrush head is completed until the tail plug 4 is snap-fitted with the supporting housing 1 and cannot be pulled out from the supporting housing 1. This design/solution can maximize the cleaning degree of the electric toothbrush, prolong the service life of the electric toothbrush, and eliminate noise thereof, and solve problems of too much noise caused by leftward and rightward swings of the cylinder 9, too much noise caused by leftward and rightward swings of the transmission shaft 3, and insufficient service life and strength, and thus the electric toothbrush head of the disclosure is convenient to use. In the past, noise resulting from leftward and rightward swings of the cylinder was too loud, and noise caused by leftward and rightward swings of the intermediate transmission shaft was too loud, resulting in insufficient service life and strength.

The above is only some preferred embodiments of the disclosure, but the protection scope of the disclosure is not limited thereto. Without departing from the technical scope of the disclosure, any equivalent substitution or change/modification made by technicians familiar with this technical field according to the technical solutions and the concept of the disclosure shall be covered within the protection scope of the disclosure.

What is claimed is:

1. An electric toothbrush head, comprising: a brusher (2), a supporting housing (1), a transmission shaft (3), and a tail plug (4);
    wherein the brusher (2) is provided with a hairy surface, an inner wall of the brusher (2) facing away from the hairy surface is provided with an outer ring column (5), a pothole (6) is provided in a middle of the outer ring column (5), and two spiral fitting grooves (7) are respectively provided at two symmetrical ends of an outer sidewall of the outer ring column (5);
    wherein a connector (8) is provided on a top of the supporting housing (1), the connector (8) is matched with the brusher (2), a cylinder (9) is provided in a middle of the connector (8) and matched with the outer ring column (5), two first bayonets (15) are respectively provided at two symmetrical ends of an inner wall of the connector (8), and the two first bayonets (15) are respectively snapped with the two spiral fitting grooves (7);
    wherein a positioning pin (14) is provided at a topmost portion of the transmission shaft (3) and matched with the supporting housing (1), a second bayonet (16) is provided at a central point of the positioning pin (14), and the second bayonet (16) is arranged in a middle of the pothole (6); and
    wherein the tail plug (4) is provided with a third bayonet (10) fitted with the supporting housing (1).

2. The electric toothbrush head according to claim 1, wherein each of the brusher (2), the supporting housing (1) and the tail plug (4) is an environmentally friendly plastic part, and the supporting housing (1) wraps the transmission shaft (3) and the tail plug (4).

3. The electric toothbrush head according to claim 1, wherein the supporting housing (1) is provided with an opening, and a part of the transmission shaft (3) close to the opening is provided with a starting button (12).

4. The electric toothbrush head according to claim 1, wherein the tail plug (4) is snap-fitted with the transmission shaft (3), and the connector (8) is rotatably connected to the supporting housing (1).

5. The electric toothbrush head according to claim 1, wherein an outer sidewall of the supporting housing (1) is provided with anti-skid prisms (11), an end of the tail plug (4) facing away from the third bayonet (10) is provided with an annular gasket (13), and the annular gasket (13) is matched with a bottom end of the supporting housing (1).

* * * * *